United States Patent [19]

Kanou

[11] Patent Number: 4,475,171
[45] Date of Patent: Oct. 2, 1984

[54] ELECTRONIC PHRASE TRANLATION DEVICE

[75] Inventor: Ikuo Kanou, Yamatokoriyama, Japan

[73] Assignee: Sharp Kabushiki Kaisha, Osaka, Japan

[21] Appl. No.: 200,134

[22] Filed: Oct. 24, 1980

[30] Foreign Application Priority Data

Oct. 25, 1979 [JP] Japan .................. 54-138519

[51] Int. Cl.³ .................. G06F 15/02; G06F 15/38
[52] U.S. Cl. .................. 364/900; 364/419
[58] Field of Search ... 364/200 MS File, 400 MS File, 364/419

[56] References Cited

U.S. PATENT DOCUMENTS 4,158,236  6/1979  Levy ........................ 364/900

FOREIGN PATENT DOCUMENTS 2014765  8/1979  United Kingdom ........... 364/900

Primary Examiner—Felix D. Gruber
Assistant Examiner—John G. Mills
Attorney, Agent, or Firm—Birch, Stewart, Kolasch & Birch

[57] ABSTRACT

An electronic translator comprises a memory for storing a plurality of trios each comprising one word, one phrase containing the word, and one translated word or words euivalent to the phrase. The memory is addressed to retrieve an input word and to develop one of the plurality of phrases and translated words. A circuit is provided for detecting and selecting one word, contained within a phrase entered by an input device, suitable for finding the proper address in the memory which contains the phrase and translated words sought.

6 Claims, 8 Drawing Figures

|  | Control Code | Memorized Data | Display |
|---|---|---|---|
| FIG. 3(A) | $c_1$ | as soon as ⟶ | as soon as |
| FIG. 3(B) | $c_2$ | how are you ⟶ | How are you ? |
| FIG. 3(C) | $c_3$ | thank you ⟶ | Thank you . | ns
ELECTRONIC PHRASE TRANLATION DEVICE

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from conventional types of electronic devices in that the former is of a unique structure which provides for efficient and rapid retrieval of word information stored in a memory. An example of such an electronic interpreter was disclosed in Levy U.S. Pat. No. 4,158,236, June 12, 1979, "ELECTRONIC DICTIONARY AND LANGUAGE INTERPRETER".

Usually, conventional electronic translators do not store phrases as entry words because of limited capacity of a memory.

Instead, a phase is stored in association with a specific word (typically, the most important word of the phase) which is treated as an entry word in the translator. In such a case, the electronic translator may contain a translated word equivalent to the phrase, the stored phrase being associated with a specific word in the input phrase, but not associated with any other word of the phrase.

If the specific word associated with the phrase in memory is entered, the translator will search such a phrase base upon this specific word. However, if any other word of the phrase is entered, the phrase can not be retrieved.

To eliminate the above described inconvenience, it is desirable to obtain a translation of a phrase, directly in response to the input of the phrase.

SUMMARY OF THE INVENTION

Accordingly, it is an object of the present invention to provide an improved electronic translator comprising means for causing retrieval of a translated word equivalent to a phrase, directly in response to the input of the phrase.

It is another object of the present invention to provide an improved electronic translator for searching an entry word with which a phrase is associated in memory, the entry word forming the phrase, in response to the input of the phrase.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the detailed description.

To achieve the above objects, pursuant to an embodiment of the present invention, an electronic translator comprises a memory for storing a plurality of trios, sets of three data entries, each comprising data representing one word, one phrase containing the word, and one translated word or words equivalent to the phrase, wherein the memory is addressed for each of the plurality of words to develop one of the plurality of phrases and translated words. A retrieval circuit is provided for detecting and selecting one word, contained within a phrase entered by an input device, suitable for finding the proper address in the memory.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 3(A), 3(B) and 3(C) show control codes each specifying a specific circuit operation;

DESCRIPTION OF THE INVENTION

First of all, any languages can be applied to an electronic translator of the present invention. An input word is spelled in a specific language to obtain an equivalent word, or a translated word spelled in a different language corresponding thereto. The languages can be freely selected. According to an example of the present invention, it is assumed that the input language is English and the translated language is Japanese.

Figure 1:
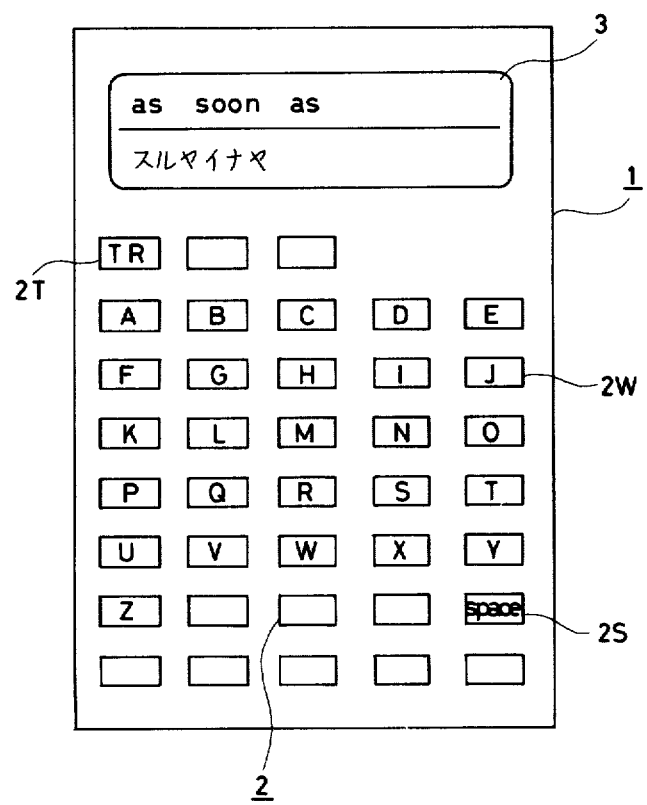
FIG. 1 shows a plan view of an electronic translator according to the present invention.

Referring not to FIG. 1, there is illustrated an electronic translator 1 according to the present invention. The electronic translator 1 comprises an alphabetical keyboard 2, a translation key switch 2T, a space key switch 2S, and a display 3.

The alphabetical keyboard 2 contains a full number of alphabetical key switches 2W each actuated to enter a single letter. The translation key switch 2T is actuated to commence translation from English to Japanese. The space key switch 2S is actuated to enter a space between words and phrases. The display 3 may be of a dot matrix type of liquid crystal display. The display 3 comprises an upper display for displaying an English word entered by the alphabetical keyboard 2, and a lower display for displaying a translated Japanese word, equivalent to the English word, which is obtained by operation as described below.

Figure 2A:
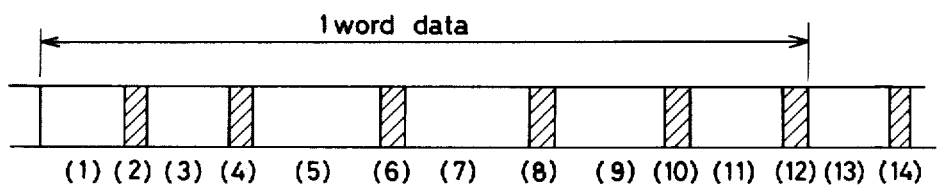
FIGS. 2(A) and 2(B) each show a system indicating word information storage format in accordance with the principle of the present invention and a more detailed example of a word information storage format.
Figure 2B:
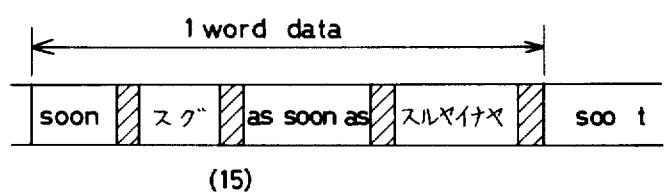

FIGS. 2(A) and 2(B) each shown a system indicating word information storage format in accordance with the principle of the present invention and a more detailed example of a word information storage format.

FIG. 2(A) shows memory portions (1) through (14), in which data with respect to a single entry word are stored by memory portions (1) through (12). The contents of each of them are as follows:

(1): a single English word as an entry word (3): a translated Japanese word equivalent to the single English word stored in (1)

(5) and (9): phrases formed by the single English word stored in (1)

(7) and (11): translated Japanese words equivalent to each of the phrases stored in (5) and (9)

(2), (4), (6), (8), (10) and (12): separation codes adhered to separate words;

(13): a single English word, as a next entry word, following the word of (1); and (14): a separation code for the word of (13).

With reference to FIG. 2(B), there is shown a more detailed example of storing a particular word "soon" and its related words, the word "soon" being an entry word used to develop the word and its related words. There are stored the related words containing a translated and Japanese word equivalent to the word "soon", a phrase of "as soon as", and a translated Japanese word equivalent to the phrase.

A feature of the present invention is that a phrase is associated with a word forming part of the phrase, the number of letters of which is the greatest of any word forming the phrase. When there are present two or more words each having an equal number of letters which is the greatest of the words forming the phrase, the first of these words is selected to be associated with the phrase.

Two examples of selection of such words according to the above described standard are shown with respect to two phrases as follows:

as soon as: soon
get out of: get

The above described arrangement of stored data enables rapid retrieval of a phrase in response to input of the phrase with a simplified control.

FIGS. 3(A), 3(B) and 3(C) show control codes each specifying a specific circuit operation while the phrase as obtained is to be displayed.

Each of the control codes is stored in the memory portion (15) of FIG. 2(B). A specific circuit operation by each of the control codes is as follows:

$C_1$ of FIG. 3(A): the stored data are shown without any change.

$C_2$ of FIG. 3(B): the first word is written with a capital letter and a question mark is added to the end of the sentence.

$C_3$ of FIG. 3(C): the first word is written with a capital letter and a period is added to the end of the sentence.

The control code is used to control the display format of a phrase, resulting in a correct display with a high visibility without any increase in memory capacity of a memory.

Figure 4:
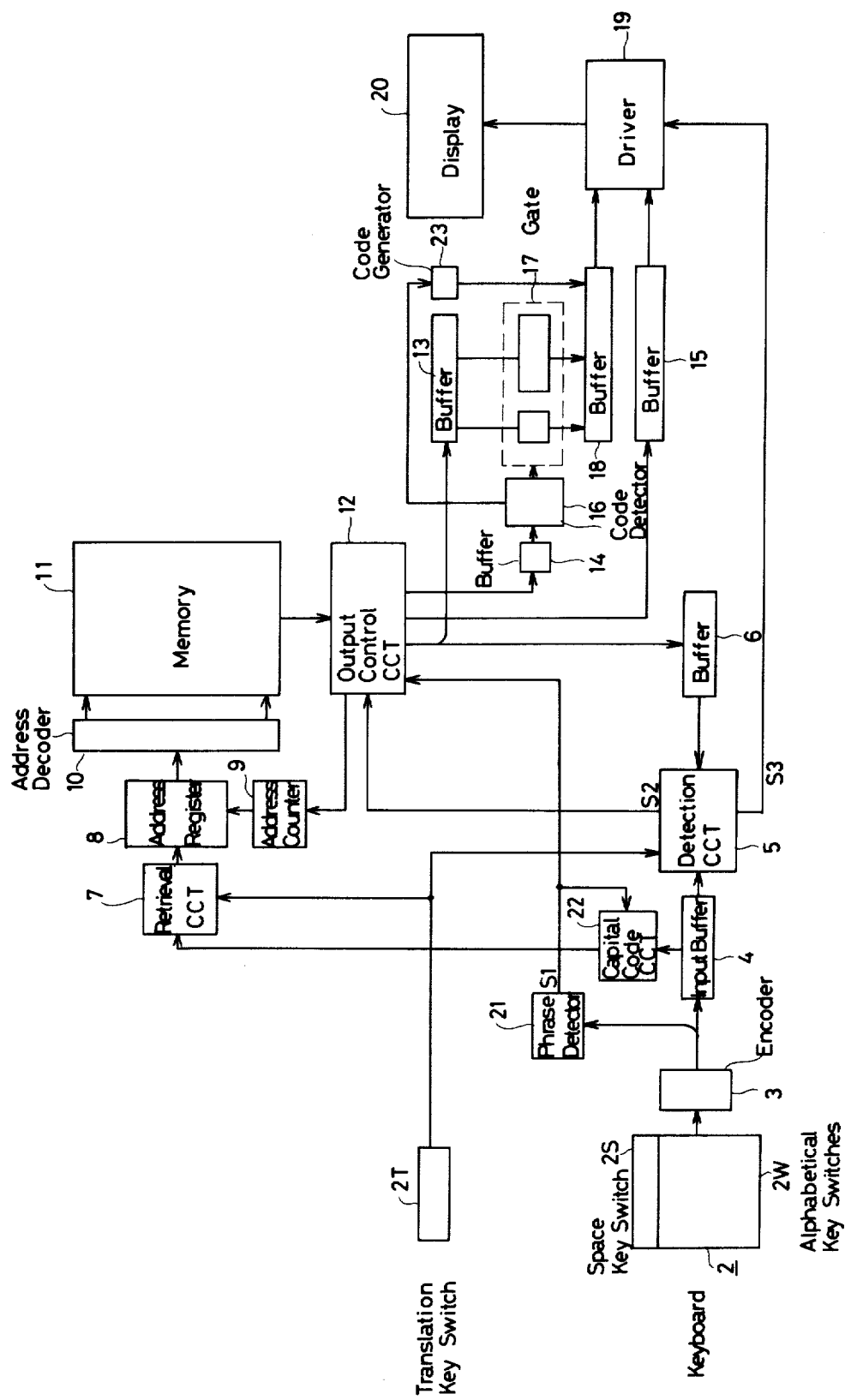
FIG. 4 shows a block diagram of a circuit implemented with the electronic translator as shown in FIG. 1.

FIG. 4 shows a block diagram of a circuit implemented within the electronic translator of FIG. 1.

The circuit comprises the above described alphabetical keyboard 2, the alphabetical key switches 2W, the space key switch 2S, the translation key switch 2T, an encoder 3, an input buffer 4, a detection circuit 5, buffers 6, 13, 14, 15 and 18, a retrieval circuit 7, an address register 8, an address counter 9, an address decoder 10, a memory 11, an output control circuit 12, a code detector 16, a gate 17, a driver 19, a display 20, a phrase detector 21, a capital code circuit 22, and a code generator 23.

More particularly, the encoder 3 is provided for encoding key input signals by the keyboard 2 to coded information. The input buffer 4 receives and contains the coded information. The detection circuit 5 is provided for detecting equivalency between the contents of the input buffer 4 and contents of the buffer 6 by comparing them. The buffer 6 receives words and phrases developed by the memory 11. The retrieval circuit 7 is provided for storing the first addressed number for the memory 11 with the object that the memory 11 is addressed according to the first address and its following addresses.

Responsive to the actuation of the translation key switch 2T, the retrieval circuit 7 provides a certain address to the address register 8. The address decoder 10 is connected to the address register 8 for decoding the contents of the register 8 so as to address the memory 11.

The memory 11 contains words, translated words and phrases as shown in FIGS. 2(A) and 2(B). It is composed of a Read Only Memory (ROM), for example.

The memory 11 is addressed by the address decoder 10 which provides words to the output control circuit 12 in units of 1 word data. The circuit 12 serves to develop signals and provide them to the address counter 9 so as to increase the address of the address register 8, and to subsequently receive each word developed by the memory 11. The buffer 13 is coupled to the circuit 12 for receiving and containing words or phrases. The buffer 14 is provided for receiving the control codes of FIGS. 3(A) to 3(C) from the memory 11 through the circuit 12.

The code detector 16 is connected to the buffer 14 for detecting the form of the control codes $C_1$ through $C_3$. The gate 17 is coupled to the detector 16 for modifying each display format, as shown in FIGS. 3(A) to 3(C), depending on the form of the control codes detected by the detector 16. The buffer 18 is provided for receiving and containing word or phrase data modified by the gate 17. The buffer 15 is provided for receiving each translated word of phrase from the memory 11 through the circuit 12.

The driver 19 is coupled to each of the buffers 15 and 18 for enabling display of the contents of these buffers in the display 20 corresponding to the display 3 of FIG. 1. The phrase detector 21 serves to detect whether data entered by the keyboard 2 represent any phrase by detecting whether space code information is generated by actuation of the space key switch 2S.

The capital code circuit 22 serves to detect the word having the greatest number of letters of a phrase being entered by the keyboard 2 to the input buffer 4. If the circuit 2 detects two or more words having an equal number of letters more than any other word or words, it selects the first of each words.

The circuit 22 provides to the retrieval circuit 7 a code representing the first letter of the word selected in accordance with the above described manner. The retrieval circuit 7 is responsive to the code developed by the circuit 22 for addressing the memory 11 so as to select words each having the same first letter as that specified by the circuit 22 and to develop phrases each associated with the selected words. A detailed example of the circuit 22 is described in FIG. 5.

The code generator 23 is connected to the buffer 18 and the code detector 16 and responsive to the output of the detector 16 for generating a particular code to the buffer 18. In particular, when the detector 16 detects the control code $C_2$, the code generator 23 generates coded information representing the question mark and provides it to the buffer 18. The gate 17 comprises means for changing a small letter as the leading letter to a capital letter to apply it to the buffer 18. When the detector 16 detects the control code $C_3$, the code generator 23 provides coded information representing a period to the buffer 18.

The output control circuit 12 receives $S_1$ signals which are developed by the phrase detector 21 when a phrase is entered by the keyboard 2. Responsive to the $S_1$ signals, the output control circuit 12 transfers data representing each phrase from the memory 11 to each of the buffers 6 and 13 and translated phrases to buffer 15.

When the $S_1$ signals are not introduced to the circuit 12, the the circuit 12 transfers data representing each word, exclusive of any phrase, from memory 11 to the buffers 6 and 13 and translated words equivalent to each word to the buffer 15.

An exemplary operation of the circuit will be described with reference to the input of the phrase "as soon as" as follows:

A certain number of alphabetical key switches 2W are actuated to enter the exemplary phrase and the encoder 3 is operated to encode the phrase, entering coded information to the input buffer 4. The space key switch 2S is actuated between the word "soon" and each of the words "as". The phrase detector 21 detects the space code generated by the actuation of the space key switch 2S, indicating that the contents of the input buffer 4 represents a phrase. The detector 21 provides the $S_1$ signals to each of the capital code circuits 22 and the output control circuit 12.

Responsive to the entrance of the $S_1$ signals, the circuit 22 detects and selects one word of the phrase having the greatest number of letters. In this case, the word is "soon". It further serves to develop a code representing the first letter "s" of "soon" and provides such code to the retrieval circuit 7.

Figure 5:
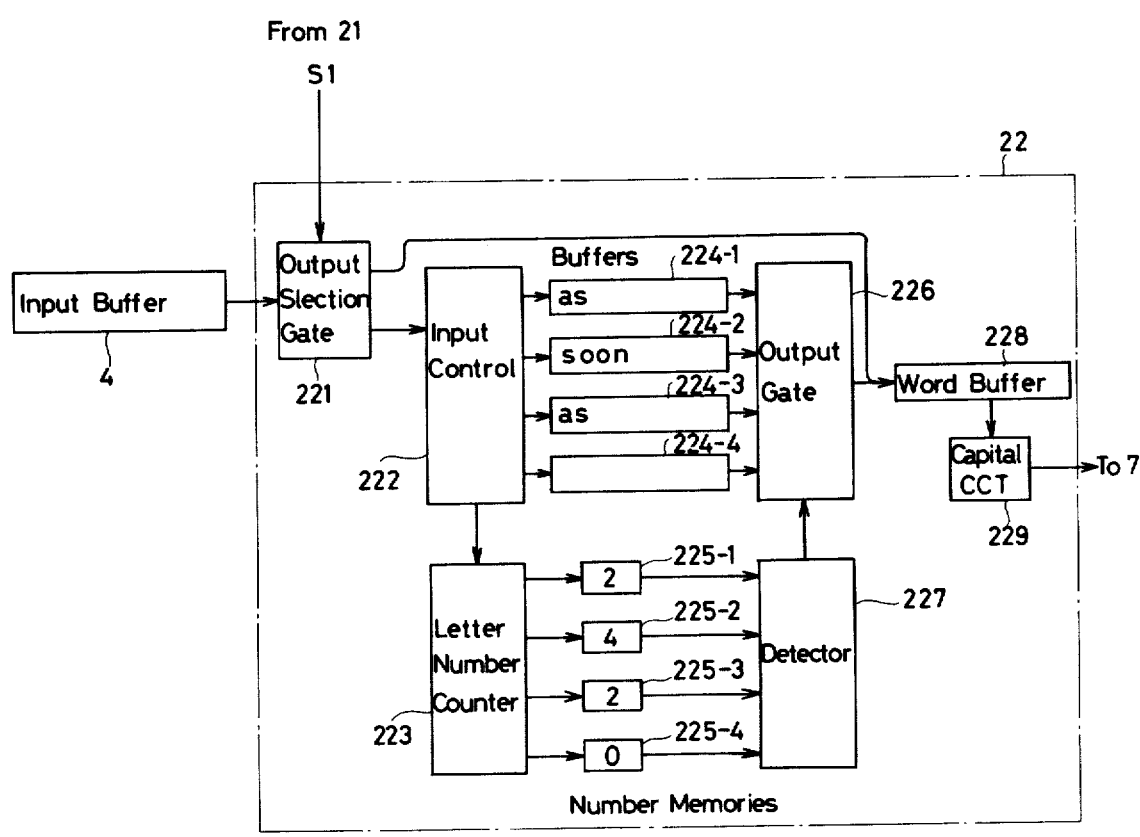
FIG. 5 shows a block diagram of a circuit element connected in the circuit of FIG. 4.

FIG. 5 shows a more detailed block diagram of the capital code circuit 22. With reference to FIG. 5, the circuit 22 comprises an output selection gate 221, an input control 222, a letter number counter 223, buffers 224-1 through 224-4, number memories 225-1 through 225-4, an output gate 226, a detector 227, a word buffer 228, and a capital circuit 229.

The gate 221 is responsive to the $S_1$ signals applied by the phrase detector 21 for sending the information received from the input buffer 4 to either the control 222 or the word buffer 228 depending on the presence or the absence of the $S_1$ signals, respectively. When the $S_1$ signal is received by gate 221, the information from the input buffer 4 is applied to the control 222 and the control 222 sends each of the words forming the phrase contained in the input buffer 4 to the respective buffers 224-1 through 224-4. Now, the input buffer 4 contains "as soon as", so that each of the buffers 224-1 through 224-3 contains "as", "soon" and "as", respectively.

The letter number counter 223 is coupled to the control 222 for counting the number of letters of each word which is sent from the control 222 to each of the buffers 224-1 through 224-4. Each of the numbers counted by the counter 223 is applied to each of the memories 225-1 through 225-4. Each of the buffers 224-1 through 224-4 corresponds to one of the memories 225-1 through 225-4. In the case of "as soon as", each of the memories 225-1 through 225-4 contains "2", "4", "2" and "0".

The detector 227 serves to detect the maximum of the contents of the memories 225-1 through 225-4. It develops information representing what memory contains the maximum, and provides such information to the gate 226. As a result, the gate 226 permits the word having the greatest number of letters to be transferred from one of the buffers 224-1 through 224-4 to the word buffer 228. In the case where there are present two or more words of equal length having the greatest number of letters, the detector 227 selects the first of these words for the purpose of being transferred to the word buffer 228.

In the case of "as soon as", the buffer 228 receives "soon". The capital circuit 229 is connected to the word buffer 228 for receiving data representing the leading letter of the word, "soon", stored in the word buffer 228. The data representing the leading letter is sent by circuit 229 to the retrieval circuit 7.

However, if the $S_1$ signals are not developed by the phrase detector 21, meaning that the input buffer 4 contains only a word, the output selection gate 221 transfers the word contained within the buffer 4 to the word buffer 228, directly.

As stated above, the circuit 22 functions to provide the above described detection circuit.

Turning now to FIG. 4, the retrieval circuit 7 is responsive to the actuation of the translation key switch 2T for providing a certain address to the address register 8. The address decoder 10 is responsive to the address set in the address register 8 for addressing the memory 11 to retrieve its contents and provide them to the output control circuit 12. The circuit 12 generates output signals which are applied to the address counter 9 to advance the address by one. The memory 11 is sequentially addressed on the basis of this new address.

During the period when the memory 11 develops each item of word information as stored therein, each of the separation codes as shown in FIGS. 2(A) and 2(B) are detected so that there are separately detected an English word as an entry word, its translated Japanese word, a phrase formed by the entry word, its translated Japanese word or phrase, one after another. Advantageously, the phrase as memorized is related to a word forming the phrase, facilitating retrieval of the phrase in response to the input of the word forming it as one of the features of the present invention.

As mentioned above, the memory 11 is addressed to develop the stored words having the leading letter "s", like the entry word. The buffer 6 receives each of the phrases related to each of the stored words. The detection circuit 5 functions to compare the phrase in the input buffer 4 and that in the buffer 6, providing $S_2$ signals to the output control circuit 12 when they are not equivalent. Responsive to the $S_2$ signals, the circuit 12 provides its output signals toward the address counter 9 to improve address by one. The memory 11 is addressed to develop the next English word as the entry word and a phrase related to the word, if any.

This operation is repeated until the detection circuit 5 detects that the phrases within the buffers 4 and 6 are equivalent i.e., that each of the buffers 4 and 6 contains "as soon as". The circuit 5 provides $S_3$ signals toward the driver 19. In such a case, the buffer 14 contains the control code $c_1$ and the detector 16 detects this code. The buffer 13 stores the phrase from the circuit 12 so that the phrase is transferred to the buffer 18 through the gate 17. The display 20 shows the phrase and its translated word as shown in FIG. 1.

If the above described search operation is conducted completely and the detection circuit 5 can not detect the equivalency, it means that the memory 11 does not store the phrase sought. It may be possible for the memory 11 to provide an indication to this effect in the display 20.

While only certain embodiments of the present invention have been described, it will be apparent to those skilled in the art that various changes and modifications may be made therein without departing from the spirit and scope of the invention as claimed.

What is claimed is:

1. An electronic language translator wherein a phrase comprising a plurality of first words represented in a first langauge is entered to obtain at least one second word represented in a second language equivalent in meaning to the phrase comprising:
    input means for entering a phrase comprising a plurality of first words in a first language;
    means for receiving said phrase in said first language from said input means, for separating said phrase into its component words, and for storing each of said component words;
    means for counting the number of letters contained in each of said component words;
    selecting means associated with said counting means for selecting the largest component word comprising the greatest number of letters of all said component words;
    memory means for storing a plurality of sets of data entries, each set comprising one word in said first language, one phrase containing said one word in said first language, and at least one translated word equivalent in meaning to said one phrase;
    address means responsive to said selecting means for addressing said memory means for retrieving said stored one word in said first language corresponding to said largest component word, its associated phrase in said first language and said equivalent translated word or words;
    means for comparing said retrieved associated phrase in said first language with said input phrase; and
    display means responsive to said comparing means for displaying said retrieved equivalent translated word or words when said associated phrase in said first language corresponds to said input phrase.

2. The translator of claim 1, wherein said input means comprises space key switch means actuable for separating each of said first words forming said phrase and to provide a specific item of code information.

3. The translator of claim 2, further comprising detection means for detecting the specific item of code information generated by said space key switch means, said means for receiving said phrase from said input means and for separating said phrase being responsive to said detection means.

4. The translator of claim 1, wherein said selecting means comprises second detection means for detecting the first letter of said largest component word.

5. The translator of claim 4, wherein said address means is responsive to said second detection means for addressing said memory means for retrieving said data entries comprising one word in said first language beginning with said first letter of said largest component word.

6. The translator of claim 1
    wherein said memory means further stores a plurality of additional items of code information interposed between said words in said first language, said phrases in said first language and said equivalent translated words;
    wherein said address means further retrieves said plurality of additional items of code information associated with said retrieved one word in said first language;
    further comprising third detection means responsive to said address means for detecting said plurality of additional items of code information;
    letter changing means responsive to said third detection means for changing a form of a letter of said retrieved phrase in said first language;
    mark generation means responsive to said third detection means for generating a question mark or a period;
    wherein said display means displays said retrieved phrase including said changed letter and said mark or period.

* * * * *